United States Patent [19]
Sugita

[11] Patent Number: 5,852,767
[45] Date of Patent: Dec. 22, 1998

[54] RADIO COMMUNICATION SYSTEM AND COMMUNICATION TERMINAL EQUIPMENTS THEREOF

[75] Inventor: Takehiro Sugita, Kanagawa, Japan

[73] Assignee: Sony Corporation, Tokyo, Japan

[21] Appl. No.: 636,404

[22] Filed: Apr. 23, 1996

[30]     Foreign Application Priority Data

Apr. 28, 1995   [JP]   Japan ................................. 7-128967

[51] Int. Cl.⁶ .......................... H04B 1/10; H04B 15/00
[52] U.S. Cl. ........................ 455/63; 455/67.5; 455/454; 455/552
[58] Field of Search ................................. 455/454, 552, 455/553, 426, 67.1, 67.5, 63, 435, 425, 448

[56]             References Cited

U.S. PATENT DOCUMENTS

| | | | |
|---|---|---|---|
| 5,307,400 | 4/1994 | Sawyer et al. | 455/435 |
| 5,475,677 | 12/1995 | Arnold et al. | 455/552 |
| 5,475,866 | 12/1995 | Ruthenberg | 455/454 |
| 5,504,803 | 4/1996 | Yamada et al. | 455/552 |
| 5,574,973 | 11/1996 | Borth et al. | 455/435 |
| 5,594,947 | 1/1997 | Grube et al. | 455/63 |
| 5,649,303 | 7/1997 | Hess et al. | 455/63 |
| 5,655,218 | 8/1997 | Smolinske | 455/435 |

*Primary Examiner*—William A. Cuchlinski, Jr.
*Assistant Examiner*—Gertrude Arthur
*Attorney, Agent, or Firm*—Jay H. Maioli

[57]             ABSTRACT

First and second radio communication units communicate using the frequency band of an existing microwave transmission system. A judgment whether the first communication unit is within communication range is performed based on information specifying the position of a base station of another radio communication system which is obtained therefrom. If found to be within communication range, the first communication unit shifts to a state and transmits a registration message to the second communication unit, which is then shifted to a transmission state. Interference in the existing microwave transmission system is prevented with a simple construction and without adding a circuit for confirming the present position of a communication unit.

9 Claims, 6 Drawing Sheets

RADIO COMMUNICATION SYSTEM AND COMMUNICATION TERMINAL EQUIPMENTS THEREOF

BACKGROUND OF THE INVENTION

1. Field of the Invention

The present invention relates to a radio communication system and communication terminal equipment thereof, and is applicable to, for instance, a communication system called unlicensed Personal Communication Service (unlicensed PCS) which has been started in the U.S.A.

2. Description of the Related Art

In the communication system called PCS in the U.S.A., two communication systems exist: one is the licensed PCS for communicating via a predetermined communication pay service and one is the free unlicensed PCS for communicating without using a predetermined communication service.

The unlicensed PCS is realized by releasing the frequency band which is now used in the microwave transmission systems. For the purpose, the microwave transmission systems should be shifted to other frequency band. However, it is said that it takes seven to ten years to complete that in the present conditions, and it has been determined that the unlicensed PCS will be used during the term so as to have no effect on the existing microwave transmission systems, and further it is necessary to add means of guaranteeing that.

Here, a conventional example of the unlicensed PCS will be described using FIG. 1. As shown in FIG. 1, in a communication terminal equipment 1 of the unlicensed PCS, a global positioning system (GPS) receiver 2 is added to confirm the present position in communication.

In starting the communication terminal equipment 1, first the receiving system consisting of a reception radio frequency circuit 3 and a demodulator 4 is set to an enabled state (active state), and the transmission system consisting of a transmission radio frequency circuit 5 and a modulator 6 is set to a disabled state (waiting state), and then a GPS signal S1 is received by an antenna 7.

The GPS receiver 2 determines the present position based on the received GPS signal S1 and outputs thus obtained position information S2 to a control circuit 8. The control circuit 8 judges whether the present position coincides with a position previously registered, based on the position information S2. If they coincide with each other, the control circuit outputs a transmission control signal S3 to the transmission radio frequency circuit 5 and the modulator 6 in order to shift the transmission system to an enabled state. Thereafter, in the communication terminal equipment 1, transmission data S4 is transmitted through the modulator 6, transmission radio frequency circuit 5, multiplexer 9, and antenna 10 to the other party to the communication. Similarly, a transmission signal from the other party is sequentially passed through the antenna 10, multiplexer 9, reception radio frequency circuit 3, and demodulator 4 to obtain reception data S5.

In the communication terminal equipment 1 of the unlicensed PCS, the present position is confirmed using the GPS receiver 2 so that the communicating operation is controlled so as to operate only at the specified position, thus preventing interference in the existing microwave transmission systems.

There is another method, in which the position is confirmed using a telephone circuit having a wire system, instead of the GPS receiver 2, thus preventing interference in the existing microwave transmission systems.

However, in the conventional communication terminal equipment 1, it is required to add the GPS receiver 2 and as a result, the construction become complicated and expensive. Also in the use of a telephone circuit having a wire system, similar problems occur because an interface to the telephone circuit must be added.

It is expected that the circuit added for position confirming will be unnecessary after the frequency band is released; therefore, controlling the communication without adding such circuits is desired.

SUMMARY OF THE INVENTION

In view of the foregoing, an object of the present invention is to provide a radio communication system and communication terminal equipment thereof, being capable of preventing interference in the existing microwave transmission systems with a simple construction.

The foregoing object and other objects of the present invention have been achieved by the provision of a radio communication system for communicating between a first and a second communication terminal equipments by using the frequency band of the existing microwave transmission systems, wherein: the first communication terminal equipment judges whether the present position is within a communicable area (communication range) based on information specifying the position of a base station of other radio communication system giving no interference in the existing microwave transmission systems which is obtained by receiving a transmitting signal therefrom, and if within a communicable area, it shifts to a transmittable state and transmits a registration message notifying being communicable to the second communication terminal equipment; and the second communication terminal equipment shifts to a transmittable state by receiving the registration message.

The first communication terminal equipment judges whether the present position is within a communicable area based on information specifying the position of a base station of other radio communication system which is obtained therefrom, and if within a communicable area, it shifts to a transmittable state and transmits a registration message to the second communication terminal equipment to be shifted to a transmittable state. Thereby, interference in the existing microwave transmission systems can be prevented with a simple structure without adding a circuit for confirming the present position as a prior art.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described with reference to the accompanying drawings:

(1) First Embodiment

Figure 1:
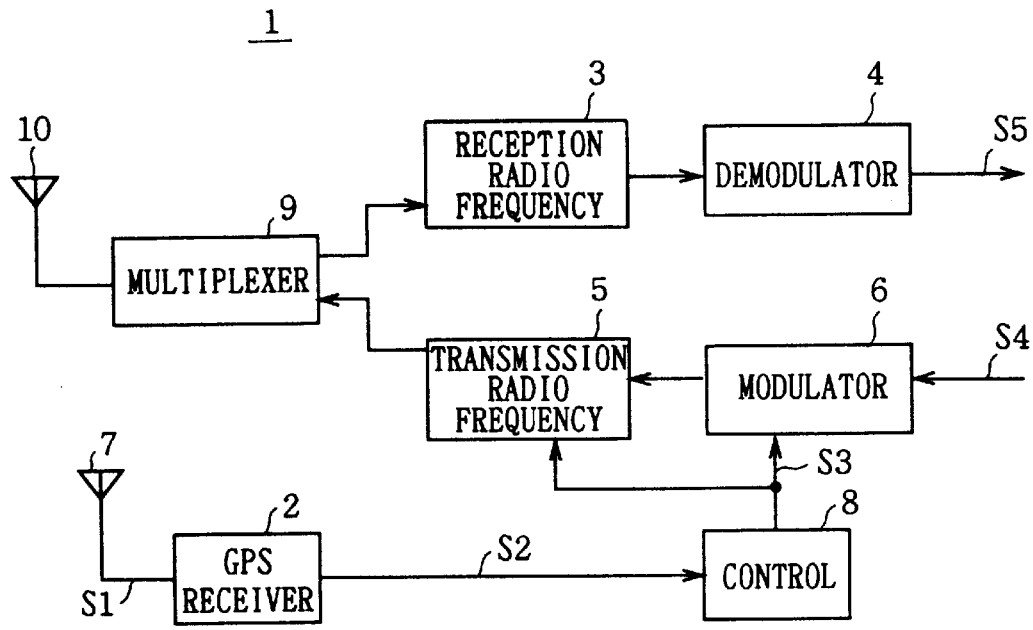
FIG. 1 is a block diagram showing the configuration of a conventional communication terminal equipment of the unlicensed PCS.
Figure 2:
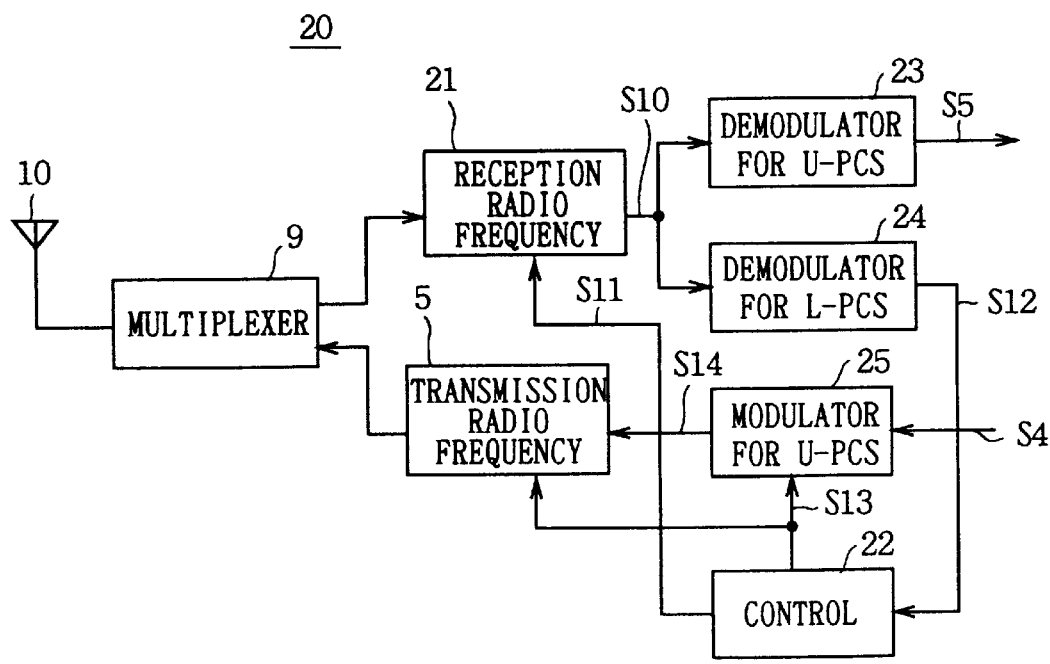
FIG. 2 is a block diagram showing the configuration of the communication terminal equipment on the mobile station side of the unlicensed PCS according to the first embodiment of the present invention.

In FIG. 2 wherein corresponding parts to FIG. 1 are denoted by the same numerals as FIG. 1, reference numeral 20 generally shows the communication terminal equipment on the mobile station side of the unlicensed PCS according to this embodiment. In the communication terminal equipment 20, a receiving signal received by an antenna 10 is input to a reception radio frequency circuit 21 through a multiplexer 9.

The reception radio frequency circuit 21 is a circuit for amplifying and frequency-converting an input receiving signal to a low-frequency signal and outputting thus obtained receiving signal S10. The reception radio frequency circuit 21 can handle both receiving signals of the unlicensed PCS and the licensed PCS. In this case, an operation of the reception radio frequency circuit 21 is shifted by a control signal S11 from a control circuit 22: in case of the unlicensed PCS, the receiving signal S10 is output to a demodulator for unlicensed PCS 23, and in case of the licensed PCS, the receiving signal S10 is output to a demodulator for licensed PCS 24.

The demodulator for unlicensed PCS 23 is a circuit for demodulating a signal of the unlicensed PCS. The demodulator 23 demodulates the receiving signal S10 to restore data transmitted from a fixed station of the unlicensed PCS, and outputs it as received data S5.

The demodulator for licensed PCS 24 is a circuit for demodulating a signal of the licensed PCS. The demodulator 24 demodulates the receiving signal S10 to restore data transmitted from a base station of the licensed PCS, and outputs it to the control circuit 22 as received data S12.

The control circuit 22 controls on/off of the transmitting system consisting of the transmission radio frequency circuit 5 and the demodulator for unlicensed PCS 25 with a transmission control signal S13, based on the received data S12 from the base station of the licensed PCS. In this case, the control circuit 22 judges whether a signal of the unlicensed PCS can be transmitted based on the received data S12, and if it can be transmitted, the control circuit 22 shifts the transmission radio frequency circuit 5 and the demodulator for unlicensed PCS 25 to an operable state.

In transmitting, the modulator for unlicensed PCS 25 modulates a predetermined carrier based on the transmitting data S4 and outputs thus obtained transmitting signal S14 to the transmission radio frequency circuit 5. The transmission radio frequency circuit 5 frequency-converts to a radio frequency signal and outputs it. The transmitting signal output from the transmission radio frequency circuit 5 is supplied to an antenna 10 via a multiplexer 9, and then transmitted to the fixed station of the unlicensed PCS from the antenna 10.

Figure 3:
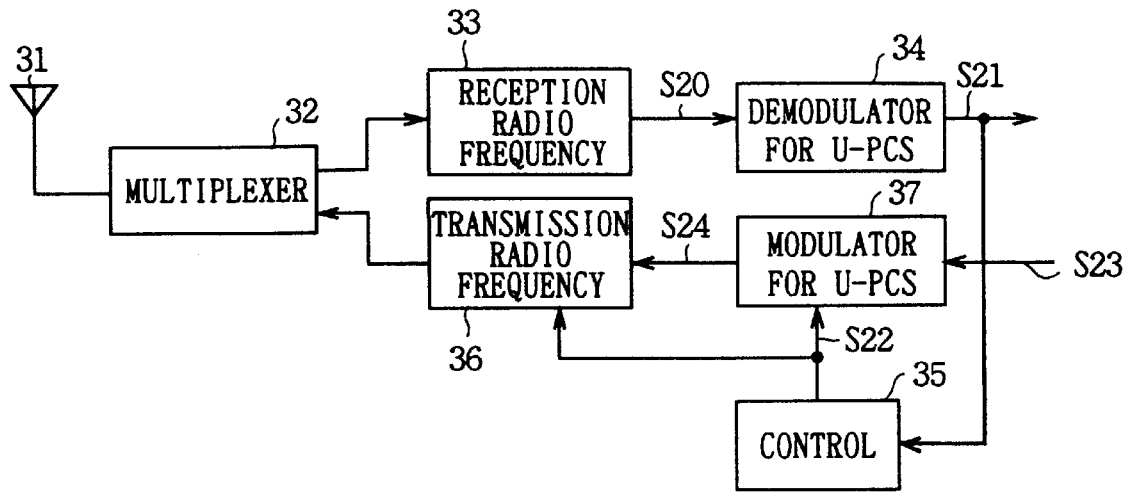
FIG. 3 is a block diagram showing the configuration of a communication terminal equipment on the fixed station side of the unlicensed PCS.

On the other hand, FIG. 3 shows the configuration of a communication terminal equipment on the fixed station side of unlicensed PCS. In the communication terminal equipment 30 on the fixed station side, as shown in FIG. 3, a receiving signal received by an antenna 31 is input via a multiplexer 32 to a reception radio frequency circuit 33.

The reception radio frequency circuit 33 amplifies and frequency-converts the receiving signal to a low-frequency signal, and outputs thus obtained receiving signal S20 to a demodulator for unlicensed PCS 34. The demodulator for unlicensed PCS 34 demodulates the receiving signal S20 to restore data transmitted from a mobile station of the unlicensed PCS, and outputs it as received data S21.

This received data S21 is input to a control circuit 35. The control circuit 35 controls on/off of the transmitting system consisting of a transmission radio frequency circuit 36 and a modulator for unlicensed PCS 37 based on the received data S21 by using a transmission control signal S22. In this case, the control circuit 35 judges whether a signal of the unlicensed PCS can be transmitted based on the received data S21, and if it can be transmitted, the control circuit 35 shifts the transmission radio frequency circuit 36 and the modulator for unlicensed PCS 37 to an operable state.

In transmission, the modulator for unlicensed PCS 37 modulates with respect to a predetermined carrier based on the transmitting data S23, and outputs thus obtained transmitting signal S24 to the transmission radio frequency circuit 36. The transmission radio frequency circuit 36 frequency-converts the transmitting signal S24 to a radio frequency signal and supplies it to an antenna 31 via a multiplexer 32, then the signal is transmitted to a mobile station of the unlicensed PCS from the antenna 31.

Here, it will be described that an operational procedure of the communication terminal equipment 20 on the mobile station side and the communication terminal equipment 30 on the fixed station side having the above structures, by using FIG. 4 and FIG. 5.

Figure 4:
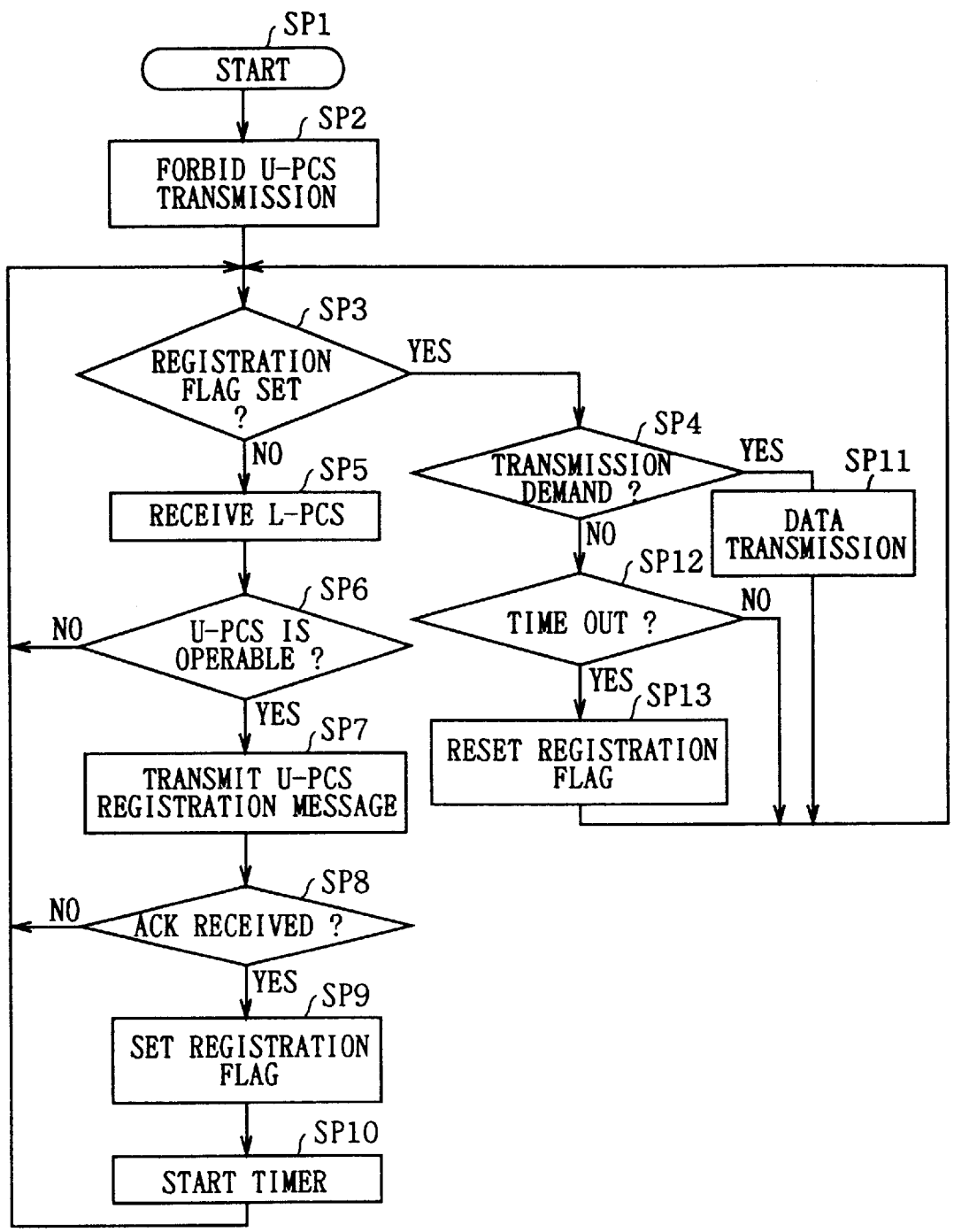
FIG. 4 is a flowchart showing the operational procedure of the communication terminal equipment on the mobile station side.

In the communication terminal equipment 20 on the mobile station side, as shown in FIG. 4, the processing is started from step SP1, and at step SP2 forbids transmission by resetting a registration flag showing a transmittable state, that is, stops the operation of the modulator for unlicensed PCS 25 and the transmission radio frequency circuit 5 by resetting a registration flag.

Then the communication terminal equipment 20, at step SP3, checks whether a registration flag is set, if set, it proceeds to step SP4, and if not set, it proceeds to step SP5. In this case, it always proceeds to step SP5 at the first time because a registration flag has been reset at step SP2.

The communication terminal equipment 20, at step SP5, receives a transmitting signal transmitted from the base station of the licensed PCS, and at next step SP6, judges whether a signal of unlicensed PCS can be transmitted or not, as a result, if it can be transmitted, it proceeds to step SP7, and if it cannot be transmitted, it returns to step SP3. In this case, the transmitting signal transmitted by the base station of the licensed PCS includes information specifying the position of the base station of the licensed PCS. The communication terminal equipment 20 confirms that the present position is within an operable area as the unlicensed PCS (that is, an area giving no interference in the microwave transmission systems) based on the information specifying the position, in order to judge whether it is transmittable or not.

The communication terminal equipment 20, at step SP7, transmits a registration message to the communication terminal equipment 30 on the fixed station side of the unlicensed PCS by operating the transmission radio frequency circuit 5 and the modulator for unlicensed PCS 25. Then the communication terminal equipment 20, at the next step SP8, awaits an acknowledgement (ACK) signal from the communication terminal equipment 30 on the fixed station side. If the ACK signal cannot be received, it returns to step SP3, if the ACK signal can be received, it proceeds to step SP9 to shift to a transmittable state by setting a registration flag, and then proceeds to next step SP10 to start a timer which counts a transmittable time, and returns to step SP3.

In this connection, being a transmittable state is notified to the fixed station side by this registration message.

If it proceeds to step SP4 as a judgment result of the registration flag, at step SP3, the communication terminal equipment 20 checks whether transmission is demanded, and if demanded, it proceeds to step SP11 to transmit data by operating the transmission radio frequency circuit 5 and the modulator for unlicensed PCS 25, and then returns to step SP3. In this connection, if data is transmitted at step SP11, the timer counting a transmittable time is restarted and a transmittable state extends.

Whereas if no transmission is demanded, the communication terminal equipment 20 checks whether the timer counting a transmittable time is time out, and if not time out yet, returns to step SP3 as it is, if time out already, it proceeds to next step SP13 to forbid transmission by resetting a registration flag, and returns to step SP3.

As the above, the communication terminal equipment 20 on the mobile station side first forbids transmission immediately after starting, judges whether being communicable as unlicensed PCS based on information from the base station of the licensed PCS, and if communicable, it sets a registration flag and shifts to a transmittable state.

Further, the communication terminal equipment 20 transmits a registration message to the communication terminal equipment 30 on the fixed station side to notify being a transmittable state (the fixed station side is shifted to a transmittable state by this registration message). In this case, the transmittable state is released by the timer, therefore, transmission is automatically stopped even in the case where the communication terminal equipment 20 is moved to another position.

Figure 5:
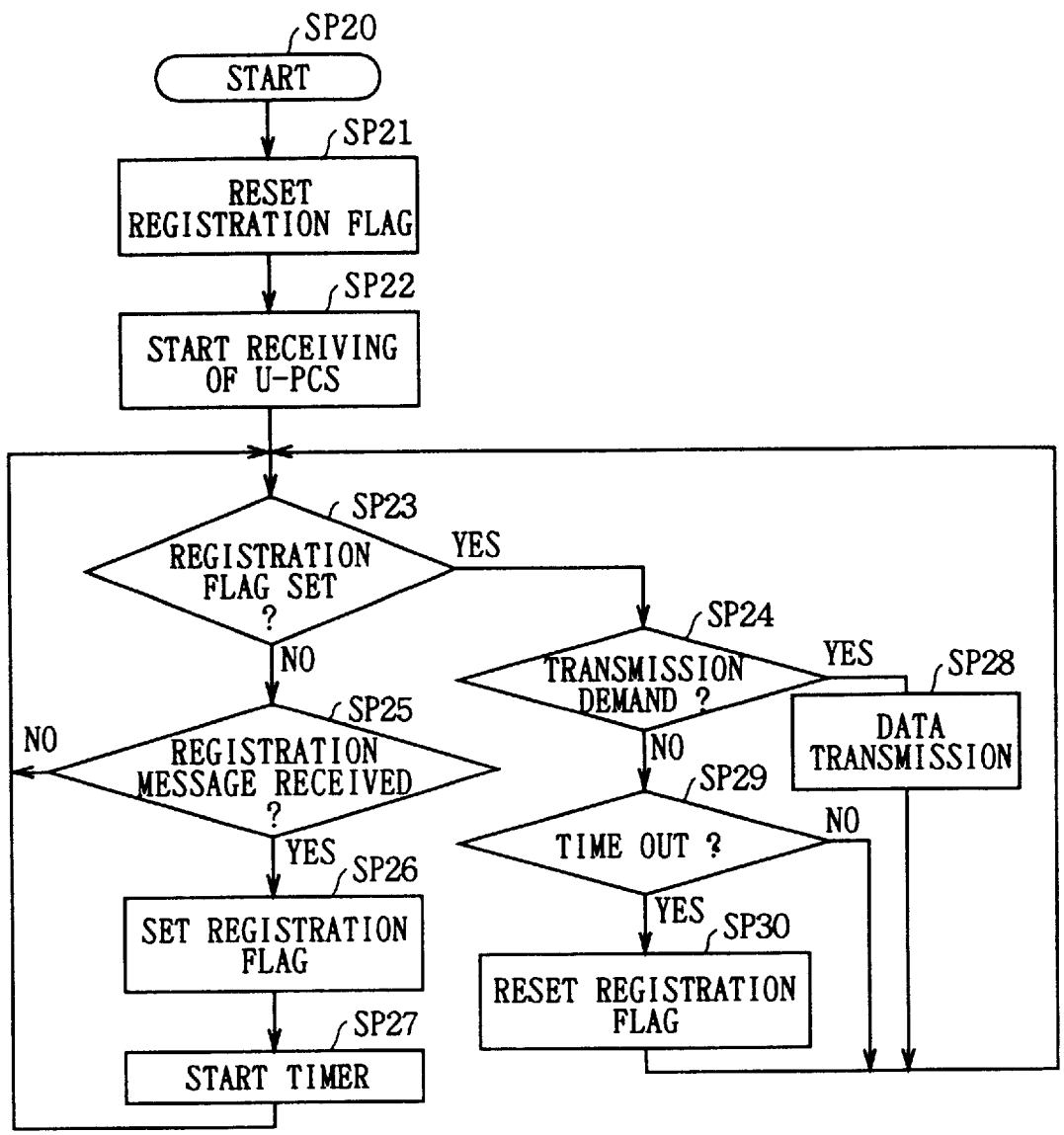
FIG. 5 is a flowchart showing the operational procedure of the communication terminal equipment on the fixed station side.

On the other hand, in the communication terminal equipment 30 on the fixed station side, as shown in FIG. 5, the processing is started from step SP20, and at step SP21, it forbids transmission by resetting a registration flag showing a transmittable state, that is, stops the operation of the modulator for unlicensed PCS 37 and the transmission radio frequency circuit 36 by resetting a registration flag.

Then the communication terminal equipment 30, at step SP22, starts receiving operation by operating the reception radio frequency circuit 33 and the demodulator for unlicensed PCS 34, and waits receiving of a registration message which is transmitted by the communication terminal equipment 20 on the mobile station side.

The communication terminal equipment 30, at step SP23, checks whether a registration flag is set, and if set, it proceeds to step SP24, if not set, it proceeds to step SP25. In this case, it always proceeds to step SP25 at the first time because the registration flag has been reset at step SP21.

The communication terminal equipment 30, at step SP25, checks whether a registration message from the mobile station side has received, and if not received, it returns to step SP23, if received, it proceeds to step SP26 to set a registration flag in order to shift to a transmittable state, and it proceeds to next step SP27 to start a timer which counts a transmittable time, and then returns to step SP23.

If it proceeds to step SP24 as a judgment result of the registration flag, at step SP23, the communication terminal equipment 30 checks whether transmission is demanded, as a result, if transmission is demanded, it proceeds to step SP28 to transmit data by operating the transmission radio frequency circuit 36 and the modulator for unlicensed PCS 37, and returns to step SP23. In this connection, if data is transmitted at step SP28, the timer counting a transmittable time is restarted and a transmittable state extends.

Whereas if no transmission is demanded, the communication terminal equipment 30 checks whether the timer counting a transmittable time is time out, and if not time out, it returns to step SP23 as it is, if time out, it proceeds to next step SP30 to reset the registration flag in order to forbid transmission, and then it returns to step SP23.

As the above, the communication terminal equipment 30 on the fixed station side first forbids transmission immediately after starting and waits a registration message which is transmitted by the communication terminal equipment 20 on the mobile station side, as a result, if a registration message is obtained, it is shifted to a transmittable state. In this case, the transmittable state is released by the timer so that transmission is automatically stopped even if the communication terminal equipment 30 is moved to another position.

In the case where communication in the unlicensed PCS is performed between the communication terminal equipments 20 and 30 according to the above structure, the communication terminal equipment 20 on the mobile station side receives a transmitting signal which is transmitted by the base station of the licensed PCS and confirms that the present position is within an operable area as unlicensed PCS, based on information specifying the position of the base station included in the transmitting signal. As a result, if within an operable area, the communication terminal equipment 20 on the mobile station side shifts to a transmittable state and transmits a registration message to the communication terminal equipment 30 on the fixed station side. Thereby, the communication terminal equipment 30 on the fixed station side is shifted to a transmittable state. Thereafter, when transmission is demanded, a signal of the unlicensed PCS is transmitted and received between the communication terminal equipments 20 and 30.

As the above, the operation of the transmitting system is controlled by specifying the present position based on information transmitted by the base station of the licensed PCS which uses almost the same level of frequency and gives no interference in the existing microwave transmission systems, so that interference in the existing microwave transmission systems can be prevented with a simple structure without adding equipment such as an interface, to a GPS receiver, a telephone circuit, etc.

Besides, the communication terminal equipments 20 and 30 resets a registration flag showing a transmittable state in accordance with a timer so that transmission can be automatically stopped even in the case where the communication terminal equipments 20 and 30 are moved to an unusable area of the unlicensed PCS.

According to the above structure, transmitting operation is controlled by judging whether the present position is within an operable area, based on the information transmitted by the base station of the licensed PCS, so that interference in the existing microwave transmission systems can be prevented with more simple construction than the previously proposed system.

(2) Second Embodiment

In this embodiment, it will be described about a dual mode communication terminal equipment capable of corresponding to both of the licensed PCS and unlicensed PCS. In the dual mode communication terminal equipment shown in this embodiment, circuits of the transmitting and receiving systems can be used in common since the frequency band of the licensed PCS touches that of the unlicensed PCS.

Figure 6:
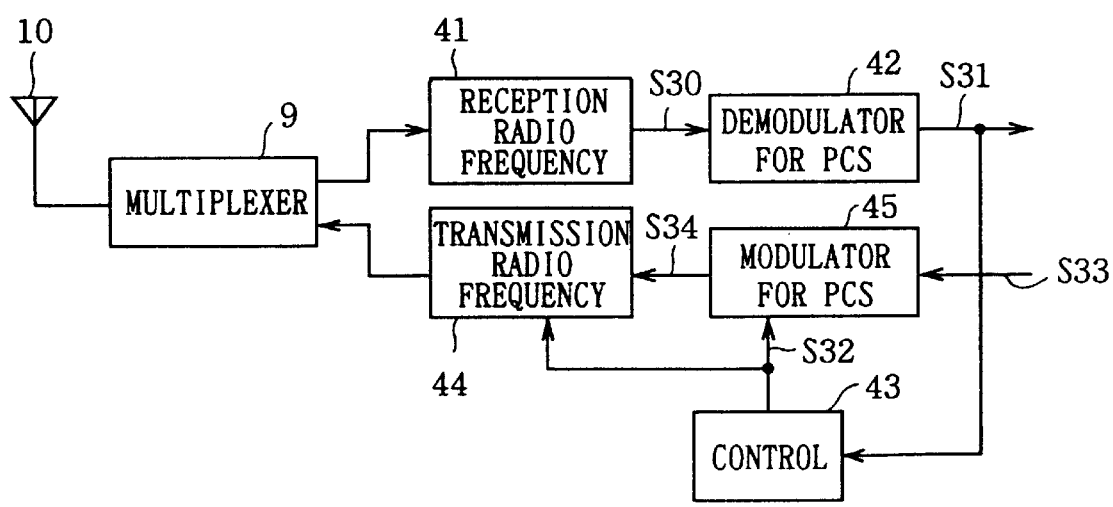
FIG. 6 is a block diagram showing the configuration of the communication terminal equipment on the mobile station side according to the second embodiment.

In FIG. 6 wherein corresponding parts to FIG. 2 are denoted by the same numerals as FIG. 2, reference numeral 40 shows the communication terminal equipment on the mobile station side according to this embodiment. The communication terminal equipment 40 is constituted of an antenna 10, a multiplexer 9, a reception radio frequency circuit 41, a demodulator for PCS 42, a control circuit 43, a transmission radio frequency circuit 44, and a modulator for PCS 45. In this case, the reception radio frequency circuit 41, the demodulator for PCS 42, the transmission radio frequency circuit 44, and the modulator for PCS 45 are applicable to both of the licensed PCS and the unlicensed PCS, respectively.

A receiving signal received by the antenna 10 is first input to the reception radio frequency circuit 41 via the multiplexer 9. The reception radio frequency circuit 41 amplifies and frequency-converts the input receiving signal to a low-frequency signal, and outputs thus obtained receiving signal S30.

The demodulator for PCS 42 demodulates with respect to the receiving signal S30 to restore data transmitted from a fixed station of the unlicensed PCS or the base station of the licensed PCS, and outputs it to the control circuit 43 as received data S31.

The control circuit 43 controls on/off of the transmitting system which is composed of the transmission radio frequency circuit 44 and the modulator for PCS 45 based on the received data S31 by using a transmission control signal S32. More specifically, the control circuit 43 judges whether it is operable or not based on data from the base station of the licensed PCS in the received data S31, as a result, if operable, the control circuit 43 shifts the transmission radio frequency circuit 44 and the modulator for PCS 45 to an operable state.

In transmitting, the modulator for PCS 45 modulates with respect to a predetermined carrier based on the transmitting data S33, and outputs thus obtained transmitting signal S34 to the transmission radio frequency circuit 44. The transmission radio frequency circuit 44 frequency-converts the transmitting signal S34 to a radio frequency signal and outputs it. The transmitting signal output from the transmission radio frequency circuit 44 is supplied to the antenna 10 via the multiplexer 9, and then transmitted to the fixed station of the unlicensed PCS or the base station of the licensed PCS.

Figure 7:
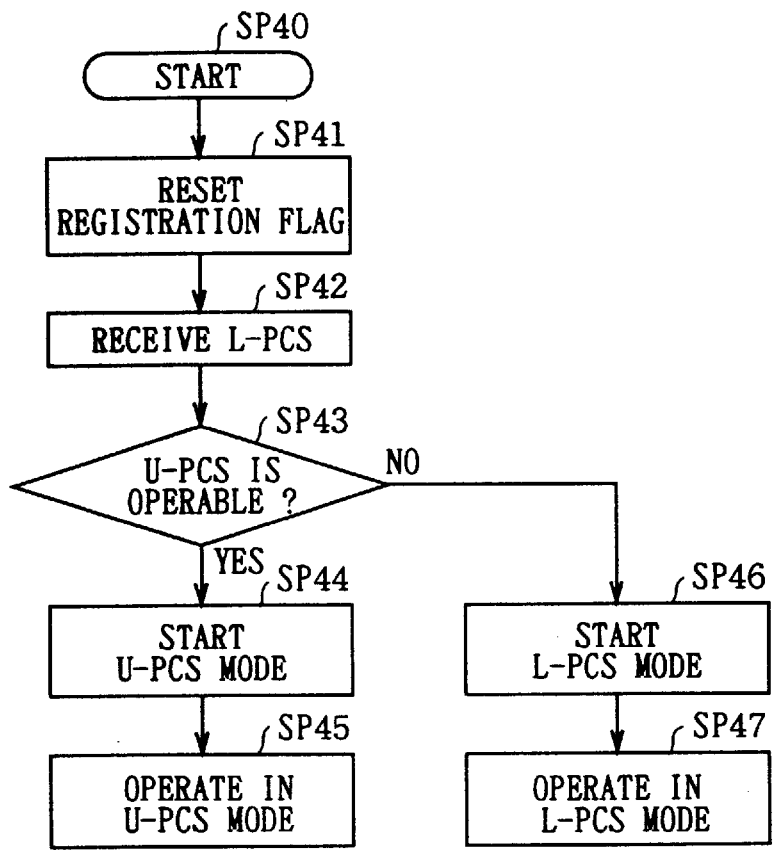
FIG. 7 is a flowchart showing an operational procedure in an unlicensed PCS priority mode.

Here in the communication terminal equipment 40 on the mobile station side having such structure, if communication by the unlicensed PCS has priority, it executes an unlicensed PCS priority mode such as shown in FIG. 7.

More specifically, in the communication terminal equipment 40 on the mobile station side, the processing is started from step SP40, and at step SP41, it resets a registration flag showing a transmittable state to forbid transmission, more specifically, it stops the operation of the modulator for PCS 45 and the transmission radio frequency circuit 44 by resetting a registration flag.

Then the communication terminal equipment 40, at step SP42, receives a transmitting signal transmitted by the base station of the licensed PCS, and at next step SP43, judges whether it is operable as unlicensed PCS or not based on the received information of the base station of the licensed PCS. In this case, it judges whether the present position is within an operable area as unlicensed PCS, based on information specifying the position of the base station included in the transmitting signal of the licensed PCS, in similar manner with the first embodiment.

As a result of the judgment, if operable as unlicensed PCS, the communication terminal equipment 40 proceeds to step SP44 to start an unlicensed PCS mode, and at next step SP45, it operates as a normal mobile station of the unlicensed PCS.

While if not operable as unlicensed PCS, the communication terminal equipment 40 proceeds to step SP46 to start a licensed PCS mode, and at next step SP47, it operates as a normal mobile station of the licensed PCS.

According to the above structure, the communication terminal equipment 40 uses the circuits of the transmitting and receiving systems (the reception radio frequency circuit 41, the demodulator for PCS 42, the transmission radio frequency circuit 44, and the modulator for PCS 45) in common between the unlicensed PCS and the licensed PCS, by utilizing that feature the frequency band of the licensed PCS touches that of the unlicensed PCS. As the above, by commonly using of the circuits in the transmitting and receiving systems, the construction can be further simplified compared with the first embodiment.

In this connection, also in this case, the transmission is controlled by judging whether it is operable as unlicensed PCS based on the information transmitted by the base station of the licensed PCS, so that interference in the existing microwave transmission systems can be prevented with a simple structure in keeping with the first embodiment.

In the above structure, the circuits of the transmitting and receiving systems are used in common between the unlicensed PCS and the licensed PCS, thereby, the structure can be further simplified.

(3) Other Embodiments

In the abovementioned second embodiment, communication by the unlicensed PCS has priority in the communication terminal equipment 40, however, the present invention is not only limited to such case. If communication by the licensed PCS has priority, it executes the licensed PCS priority mode such as shown in FIG. 8.

Figure 8:
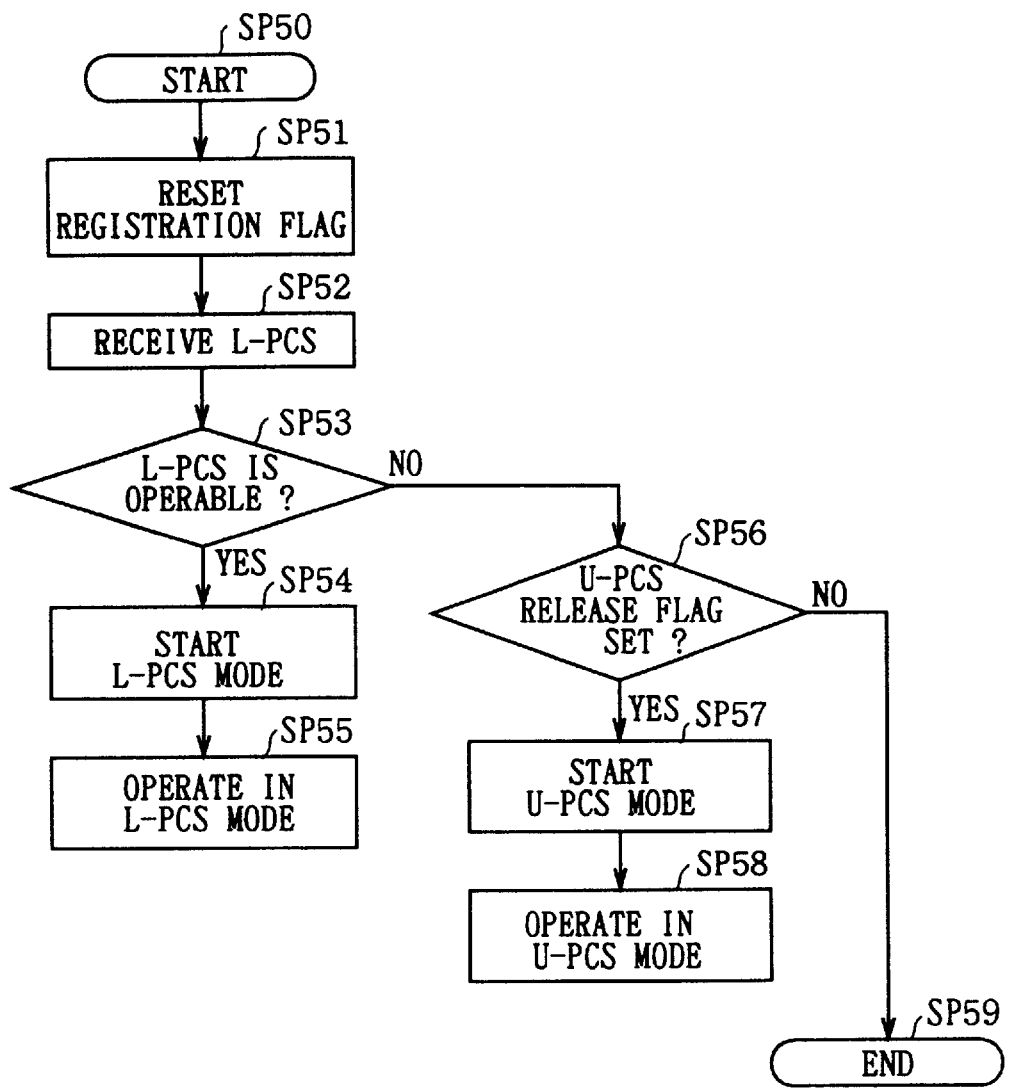
FIG. 8 is a flowchart showing an operational procedure in a licensed PCS priority mode.

More specifically, in the communication terminal equipment 40, as shown in FIG. 8, the processing is started from step SP50, and at step SP51, it resets a registration flag showing a transmittable state to forbid transmission, more specifically, it stops the operation of the modulator for PCS 45 and the transmission radio frequency circuit 44 by resetting a registration flag.

Then the communication terminal equipment 40, at step SP52, receives a transmitting signal transmitted by the base station of the licensed PCS, and at next step SP53, it judges whether being operable as licensed PCS based on the received information of the base station of the licensed PCS.

As a result, if operable as licensed PCS, the communication terminal equipment 40 proceeds to step SP54 to start a licensed PCS mode, and at next step SP55, it-operates as a normal mobile station of the licensed PCS.

While if not operable as licensed PCS, the communication terminal equipment 40 proceeds to step SP56 to check whether a release flag of the unlicensed PCS has been set. This release flag means that the frequency band is perfectly released for the unlicensed PCS and it is operable as unlicensed PCS in any area, the release flag should be set by a person given a specified license (e.g., a predetermined service trade), after releasing the frequency band.

When the release flag has been set at step SP56, the communication terminal equipment 40 proceeds to step SP57 to start an unlicensed PCS mode, and at next step SP58, it operates as a normal mobile station of the unlicensed PCS.

While if the release flag has not been set (i.e., if the frequency band is not released for the unlicensed PCS), the communication terminal equipment 40 proceeds to step SP59 to terminate without starting either the licensed PCS or the unlicensed PCS, as a result, communication by the licensed PCS can have priority.

In the above embodiments, the communication terminal equipment 20, 40 judges whether it is operable as unlicensed PCS based on the information transmitted by the base station of the licensed PCS, and if operable, it notifies it is in an operable state to the fixed station side, however, the present invention is not only limited to such a case. It can obtain similar effects to the above case that judges whether the communication terminal equipment on the fixed station side is operable as unlicensed PCS based on the information transmitted by the base station of the licensed PCS, and if operable, it notifies it is in an operable state to the mobile station side.

As described above, according to the present invention, the first communication terminal equipment judges whether the present position is within a communicable area based on information specifying the position of the base station of the other radio communication system which is obtained therefrom. And if within a communicable area, the first communication terminal equipment shifts to a transmittable state and transmits a registration message to the second communication terminal equipment to shift it to a transmittable state. Thereby, it can be accomplished that a radio communication system in which interference in the existing microwave transmission systems can be prevented with a simple structure without adding a device for confirming the present position.

While there has been described in connection with the preferred embodiments of the invention, it will be obvious to those skilled in the art that various changes and modifications may be made, therefore, to cover in the appended claims all such changes and modifications as fall within the true spirit and scope of the invention.

What is claimed is:

1. A radio communication system for communicating between a first communication terminal equipment and second communication terminal equipment by using a frequency band of an existing microwave transmission system, wherein:

said first communication terminal equipment comprises
      demodulating means for demodulating a signal transmitted from a base station of another radio communication system giving no interference with the existing microwave transmission system;
      means for judging whether a present position of said first communication terminal equipment is within an area in which communication can occur without interference with the existing microwave transmission system, based on information specifying the position of said base station of said another radio communication system giving no interference with the existing microwave transmission system, and
      means responsive to a determination by said means for judging that the present position is within said area for shifting to a transmission state and transmitting a registration message indicative of said transmission state to said second communication terminal equipment; and
   said second communication terminal equipment comprises means for shifting a transmission state in response to receiving said registration message.

2. The radio communication system according to claim 1 wherein:

said first communication terminal equipment includes
      reset means for resetting a registration flag showing a transmission state to prevent transmission,
      wherein as a result of the determination by said means for judging, if within said area in which communication can occur without interference, said first communication terminal equipment sets said registration flag to shift a transmission state, starts a timer counting transmission time, and transmits said registration message to said second communication terminal equipment; and
      when said timer times out, said reset means resets said registration flag to prevent transmission.

3. The radio communication system according to claim 1 wherein:

said second communication terminal equipment first resets a registration flag showing a transmission state after starting, to prevent transmission and waits to receive said registration message which is transmitted by said first communication terminal equipment;
   when receiving said registration message, said second communication terminal equipment sets said registration flag to shift to a transmission state and starts a timer counting transmission time; and
   when said timer times out, said second communication terminal equipment resets said registration flag to prevent transmission.

4. The radio communication system according to claim 1 wherein said first communication terminal equipment and said second communication terminal equipment are communication terminals for a communication system conforming to an unlicensed personal communication service, and said another radio communication system is a communication system conforming to a licensed personal communication service.

5. A communication terminal equipment forming a radio communication system, for communicating with a first fixed station by using a frequency band of an existing microwave transmission system, said equipment comprising:

demodulating means for demodulating a signal transmitted from a second fixed station of another radio communication system giving no interference with the existing microwave transmission system;
   means for judging whether a present position of said communication terminal equipment is within an area within which communication can occur without interference with the existing microwave transmission system based on information specifying a position of a base station or another radio communication system giving no interference with the existing microwave communication system, and
   means responsive to a determination that the present position is within said area for shifting to a transmission state and transmitting a registration message to said first fixed station so that said first fixed station shifts to a transmission state.

6. The communication terminal equipment according to claim 5 wherein said communication terminal equipment is a communication terminal equipment conforming to an unlicensed personal communication service, and said other radio communication system is a communication system conforming to a licensed personal communication service.

7. A communication terminal equipment forming a radio communication system for communicating with a fixed station by using a frequency band of an existing microwave transmission system, said equipment comprising:

transmitting and receiving means potentially communicable with said fixed station and with a base station of another radio communication system giving no interference with the existing microwave transmission system;

said transmitting and receiving means communicating with the fixed station when communicable with said fixed station and communicating with the base station when communicable with said base station;

reset means for resetting a registration flag showing a transmission state to prevent transmission; and judging means for receiving and demodulating a signal transmitted by said base station to obtain information specifying a position of said base station, and judging whether a present position of the communication terminal equipment is within an area in which communication can occur without interference with the existing microwave transmission system based on the information and as a result of the judgment, if within said area in which communication can occur without interference, communicating with said fixed station, and if not within said area, communicating with said base station.

8. A communication terminal equipment forming a radio communication system for communicating with a fixed station by using a frequency band of an existing microwave transmission system, said equipment comprising:

transmitting and receiving means potentially communicable with said fixed station and with a base station of another radio communication system giving no interference with the existing microwave transmission system;

said transmitting and receiving means communicating with the fixed station when communicable with said fixed station and communicating with the base station when communicable with said base station;

reset means for resetting a registration flag showing a transmission state to prevent transmission; and judging means for judging whether said transmitting and receiving means are communicable with said base station based on information obtained by receiving a signal transmitted by said base station and, as a result of the judgement, if communicable with said base station, communicating with the base station, and if not communicable with said base station, checking a release flag showing a release state of said fixed station, and, if the release flag has been set, communicating with the fixed station.

9. The communication terminal equipment according to claim 7 wherein said radio communication system is a communication system conforming to an unlicensed personal communication service, and said other radio communication system is a communication system conforming to a licensed personal communication service.

\* \* \* \* \*